United States Patent
Mohr

(10) Patent No.: US 12,322,228 B2
(45) Date of Patent: Jun. 3, 2025

(54) SYSTEM AND METHOD FOR MONITORING PICKUP AND DROP-OFF OF ITEMS

(71) Applicant: DARVIS INC., San Francisco, CA (US)

(72) Inventor: Jan-Philipp Mohr, Hamburg (DE)

(*) Notice: Subject to any disclaimer, the term of this patent is extended or adjusted under 35 U.S.C. 154(b) by 217 days.

(21) Appl. No.: 18/157,141

(22) Filed: Jan. 20, 2023

(65) Prior Publication Data

US 2023/0245512 A1 Aug. 3, 2023

Related U.S. Application Data

(60) Provisional application No. 63/305,363, filed on Feb. 1, 2022.

(51) Int. Cl.
*G07C 9/00* (2020.01)
*G06K 7/10* (2006.01)
*G07C 9/27* (2020.01)

(52) U.S. Cl.
CPC ..... *G07C 9/00309* (2013.01); *G06K 7/10099* (2013.01); *G07C 9/27* (2020.01); *G07C 2009/0092* (2013.01)

(58) Field of Classification Search
None
See application file for complete search history.

(56) References Cited

U.S. PATENT DOCUMENTS

| | | | |
|---|---|---|---|
| 10,452,420 B1* | 10/2019 | Koryakin | G06F 9/45558 |
| 11,049,343 B2* | 6/2021 | Lyman | G07C 9/20 |
| 11,607,068 B2* | 3/2023 | Zhu | A47G 29/141 |
| 2024/0144753 A1* | 5/2024 | O'Rourke | A47G 29/141 |

* cited by examiner

*Primary Examiner* — K. Wong
(74) *Attorney, Agent, or Firm* — RC Trademark Company

(57) ABSTRACT

Disclosed is a system and a method for monitoring pickup and drop-off of items in a storage facility, the system comprising a scanner disposed at an entry to the storage facility, the scanner configured to scan an item pickup code, and a controller, wherein the controller is configured to receive the scanned item pickup code, determine if there is an item associated with the item pickup code being stored in the storage facility; and, if so, grant entry to the storage facility to an item picker, receive one or more images of inside of the storage facility, determine an item picked by the item picker, determine that the item picked by the item picker corresponds to the item pickup code and, if not, generate a wrong pick-up signal.

20 Claims, 8 Drawing Sheets

SYSTEM AND METHOD FOR MONITORING PICKUP AND DROP-OFF OF ITEMS

TECHNICAL FIELD

The teachings herein relate generally to monitoring systems and methods and more specifically, to a system and a method for monitoring pickup and drop-off of items in a storage facility.

BACKGROUND

In recent times, increasing growth in technology has led to rapid development of various services, such as logistical services, telecommunication services, networking services, internet services, localization services and the like. Such services are being increasingly utilized by millions of users worldwide, such as by customers and/or subscribers employing such services. However, despite rapid developments across various industries, the logistics industry faces several difficulties in comfortably addressing the needs of the general population. Conventionally, to overcome the increasing need, smart mail rooms have been developed by various service providers however, such smart rooms are not user friendly and are unable to provide a safe and secure experience to the user.

Currently, the market size of Smart Package Rooms in North America is $227 Million, with an annual growth rate of 10% (CAGR). Most of the smart mail rooms are being used by postal services (60%) whereas about 25% of the overall market share is occupied by lockable rooms and cooling lockers having a market share of 15%. Thus, the importance of such a dynamic market to the logistics industry and the need to automate and digitize every step in the process of the logistics provision, for example, in a mail-delivery service, within a customer's journey is highly crucial and is yet to be addressed by current systems or methods. Thus, there is a need to for a safe, customer-friendly, and scalable solution for improving existing smart mailroom concepts that are safe or secure and include intelligent monitoring and/or analysis of the room.

Therefore, in light of the foregoing discussion, there exists a need to overcome the aforementioned drawbacks associated with the conventional techniques of monitoring pickup and drop-off of items in a storage facility.

SUMMARY

The teachings herein seek to provide a system and a method for monitoring pickup and drop-off of items in a storage facility. The teachings herein seek to provide a solution to the existing problem of a general lack of security during delivery of items via tracking or monitoring of both i.e., the person(s) within the storage facility and the items being delivered at the same time to ensure a safe, efficient, hygienic and readily accessible environment to the users. An aim of the teachings herein is to provide a solution that overcomes at least partially the problems encountered in prior art and provides an improved system and method for monitoring pickup and drop-off of items in a storage facility. The object of the teachings herein is achieved by the solutions provided in the enclosed independent claims. Advantageous implementations of the teachings herein are further defined in the dependent claims.

In one aspect, the teachings herein provide a system for monitoring pickup and drop-off of items in a storage facility, the system comprising a scanner disposed at an entry to the storage facility, the scanner configured to scan an item pickup code, and a controller, wherein the controller is configured to:
   receive the scanned item pickup code;
   determine if there is an item associated with the item pickup code being stored in the storage facility; and, if so,
   grant entry to the storage facility to an item picker;
   receive one or more images of inside of the storage facility;
   determine an item picked by the item picker;
   determine that the item picked by the item picker corresponds to the item pickup code; and, if not,
   generate a wrong pick-up signal.

In another aspect, the teachings herein provide a method for monitoring pickup and drop-off of items in a storage facility, the method comprising:
   scanning an item pickup code at an entry to the storage facility;
   determining if there is an item associated with the item pickup code being stored in the storage facility; and, if so,
   granting entry to the storage facility to an item picker;
   receiving one or more images of inside of the storage facility;
   determining an item picked by the item picker;
   determining that the item picked by the item picker corresponds to the item pickup code; and, if not,
   generating a wrong pick-up signal.

It has to be noted that all devices, elements, circuitry, units and means described in the teachings herein could be implemented in software or hardware elements or any kind of combination thereof. All steps which are performed by the various entities described in the teachings herein as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the teachings herein are susceptible to being combined in various combinations without departing from the scope of the teachings herein as defined by the appended claims.

Additional aspects, advantages, features and objects of the teachings herein would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the teachings herein, exemplary constructions of the teachings herein are shown in the drawings. However, the teachings herein are not limited to specific methods and instrumentalities disclosed herein. Moreover, those in the art will understand that the drawings are not to scale. Wherever possible, like elements have been indicated by identical numbers.

Embodiments of the teachings herein will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the teachings herein and ways in which they can be implemented. Although some modes of carrying out the teachings herein have been disclosed, those skilled in the art would recognize that other embodiments for carrying out or practicing the teachings herein are also possible.

In one aspect, the teachings herein provide a system for monitoring pickup and drop-off of items in a storage facility, the system comprising a scanner disposed at an entry to the storage facility, the scanner configured to scan an item pickup code, and a controller, wherein the controller is configured to:
  receive the scanned item pickup code;
  determine if there is an item associated with the item pickup code being stored in the storage facility; and, if so,
  grant entry to the storage facility to an item picker;
  receive one or more images of inside of the storage facility;
  determine an item picked by the item picker;
  determine that the item picked by the item picker corresponds to the item pickup code; and, if not,
  generate a wrong pick-up signal.

In another aspect, the teachings herein provide a method for monitoring pickup and drop-off of items in a storage facility, the method comprising:
  scanning an item pickup code at an entry to the storage facility;
  determining if there is an item associated with the item pickup code being stored in the storage facility; and, if so,
  granting entry to the storage facility to an item picker;
  receiving one or more images of inside of the storage facility;
  determining an item picked by the item picker;
  determining that the item picked by the item picker corresponds to the item pickup code; and, if not,
  generating a wrong pick-up signal.

In yet another aspect, the teachings herein also provide a computer-program product having machine-readable instructions stored therein, which when executed by the controller, cause the controller to perform the method.

Figure 1:
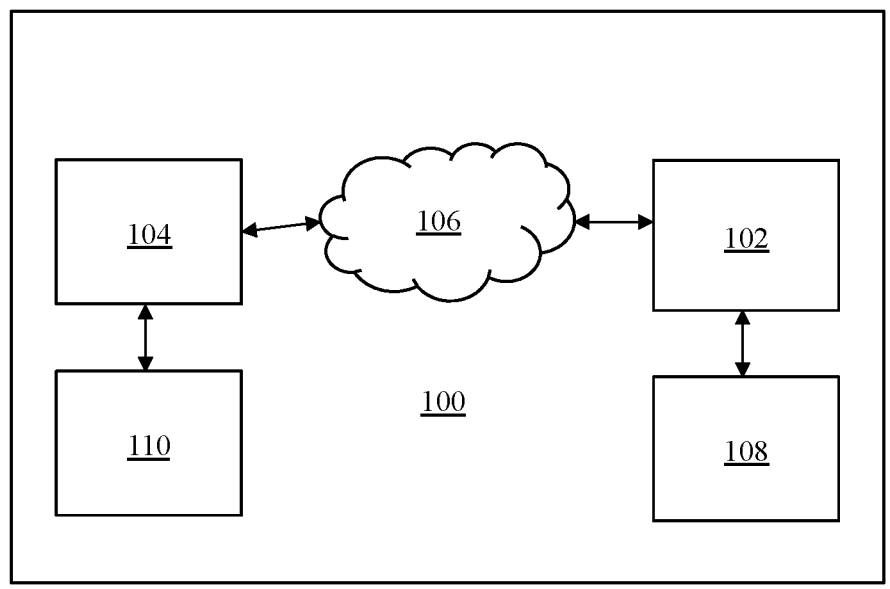
FIG. 1 illustrates a block diagram of a system for monitoring pickup and drop-off of items in a storage facility, in accordance with the teachings herein.

Referring to FIG. 1, illustrated is a schematic block diagram of a system 100 for monitoring pickup and drop-off of items in a storage facility, in accordance with various embodiments of the teachings as disclosed herein. As shown, the system 100 comprises a scanner 104 disposed at an entry to the storage facility, and a controller 102, wherein the controller 102 is communicably coupled to the scanner 104 via a communication interface 106 configured to enable communication therebetween. Typically, the system 100 is configured to monitor the pickup and drop-off of items in the storage facility, wherein the item may be any good or product to be delivered to a specified destination. Typically, users entering and exiting the storage facility are monitored by the system 100 and the method 200 to facilitate the operations of the service provider. The term "storage facility" as used herein refers to any room, space or premise configured for storing items thereat to be further delivered. In an example, the storage facility may be associated a postal courier service (such as, the United States Postal Service (USPS®)) storing multiple packages and letters from various users worldwide. In another example, the storage facility may be associated with an e-commerce platform (for example, Amazon®), storing various products and/or packages to be delivered to the users worldwide. Thus, the system 100 as disclosed in the teachings herein, is configured to monitor the pickup and drop-off of items in the storage facility in a manner that ensures a faster, efficient and query free operation by ensuring a verified and accurate pickup and drop-off of the associated items. Currently, there is a need to come up with a safe, user-friendly, and scalable solution for improving existing solutions with features such as personal protective equipment (PPE) detection, secure QR code scanning for entry, real time information on the placement of parcels, intelligent assessment of the room to know if the incorrect package has been taken and a myriad of other features that make the delivery, pickup and shipping process of items much easier, secure and highly efficient. Moreover, the computer vision technology implemented by the system 100 is AI-based and allows fast and streamlined development of new comprehensive applications.

Figure 2:
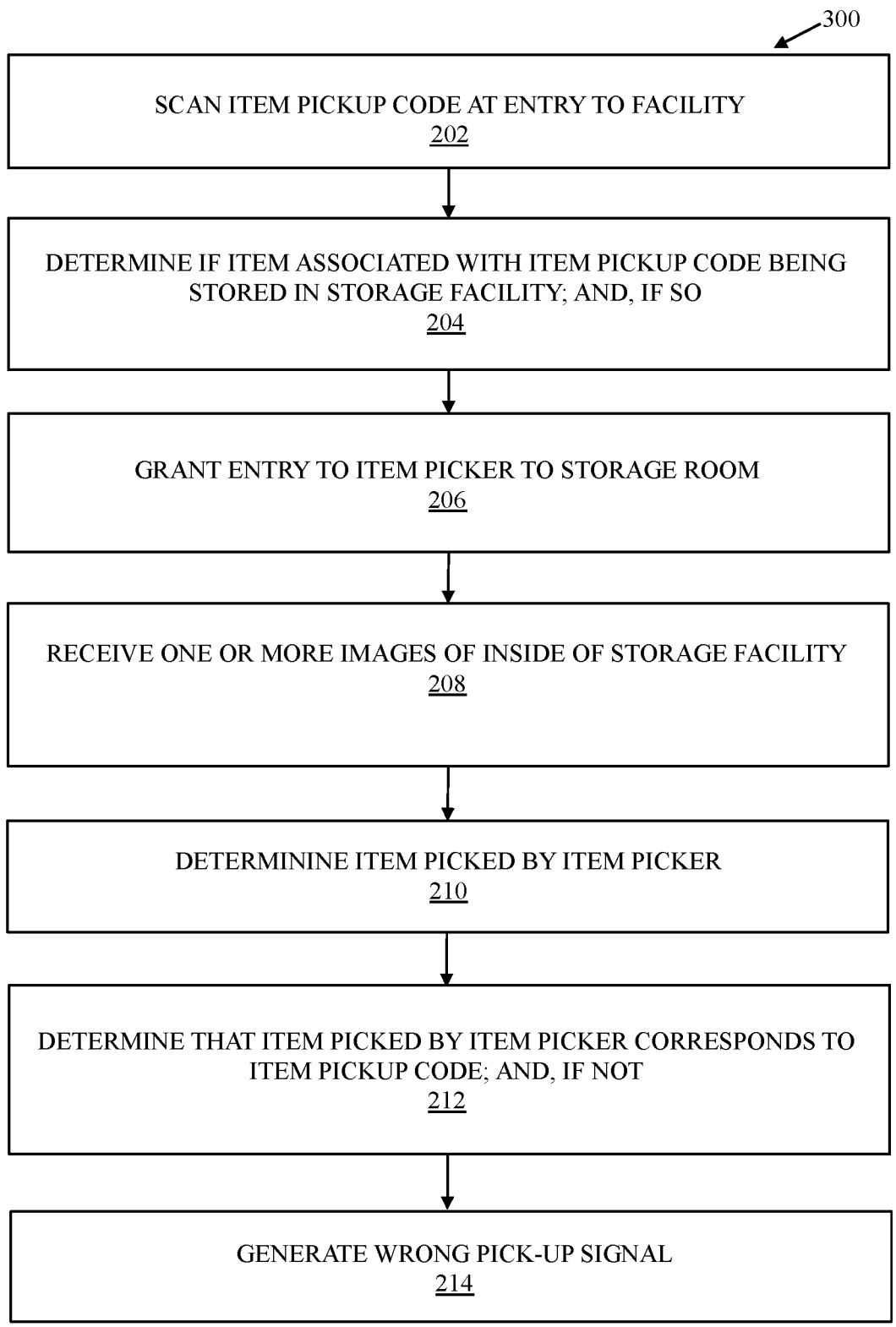
FIG. 2 illustrates a schematic flowchart listing steps involved in a method for monitoring pickup and drop-off of items in a storage facility, in accordance with various embodiments of the teachings herein.

Referring to FIG. 2, illustrated is a flowchart listing steps involved in a method 200 for monitoring pickup and drop-off of items in a storage facility, in accordance with various embodiments of the teaching as disclosed herein. The flowchart comprises steps 202 to 214, which have been described in detail in the proceeding paragraphs.

The term "controller" as used herein refers to a structure and/or module that includes programmable and/or non-programmable components configured to store, process and/or share information and/or signals relating to monitoring pickup and drop-off of items in a storage facility. The controller 102 may be having elements such as a display, control buttons or joysticks, processor, memory and the like. Typically, the controller 102 is operable to perform one or more operations for monitoring pickup and drop-off of items in the storage facility. In the present examples, the controller 102 may include components such as a memory, a controller, a network adapter and the like, to store, process and/or share information with other computing components, such as a user device, a remote server unit, a database. Optionally, the controller 102 includes any arrangement of physical or virtual computational entities capable of enhancing information to perform various computational tasks. Optionally, the controller 102 is supplemented with additional computation systems, such as neural networks, and hierarchical clusters of pseudo-analog variable state machines implementing artificial intelligence algorithms. In an example, the controller 102 may include components such as a memory, a communication interface, a network adapter and the like, to store, process and/or share information with other computing devices, such as the controller, the database, a user device (such as, associated with a delivery personnel or a user dropping of an item for delivery). Optionally, the controller 102 is implemented as a computer program that provides various services (such as database service) to other devices, modules or apparatus. Moreover, the controller 102 refers to a computational element that is operable to respond to and processes instructions to perform the monitoring of pickup and drop-off of items in the storage facility. Optionally, the controller 102 includes, but is not limited to, a microcontroller, a micro-controller, a complex instruction set computing (CISC) microcontroller, a reduced instruction set (RISC) microcontroller, a very long instruction word (VLIW) microcontroller, Field Programmable Gate Array (FPGA) or any other type of processing circuit, for example as aforementioned.

Referring to FIGS. 1 and 2 in combination, the controller 102 and the scanner 104 may be communicatively coupled via the communication interface 106 to perform the steps of the method 200 for monitoring pickup and drop-off of items in a storage facility. Additionally, the controller 102 is arranged in various architectures for responding to and processing the instructions for monitoring pickup and drop-off of items in a storage facility via the method or system. Herein, the system 100 elements may communicate with each other using the communication interface 106. The communication interface 106 includes a medium (e.g., a communication channel) through which the system 100 components communicate with each other. The term "communication interface" refers to an arrangement of interconnected programmable and/or non-programmable components that are configured to facilitate data communication between the elements of the system 100, whether available or known at the time of filing or as later developed. Furthermore, the communication interface 106 may include, but is not limited to, one or more peer-to-peer network, a hybrid peer-to-peer network, local area networks (LANs), radio access networks (RANs), metropolitan area networks (MANS), wide area networks (WANs), all or a portion of a public network such as the global computer network known as the Internet, a private network, a cellular network and any other communication system or systems at one or more locations. Additionally, the communication interface 106 comprises wired or wireless communication that can be carried out via any number of known protocols, including, but not limited to, Internet Protocol (IP), Wireless Access Protocol (WAP), Frame Relay, or Asynchronous Transfer Mode (ATM). Moreover, any other suitable protocols using voice, video, data, or combinations thereof, can also be employed. Moreover, although the system 100 is frequently described herein as being implemented with TCP/IP communications protocols, the system may also be implemented using IPX, AppleTalk®, IP-6, NetBIOS, OSI, any tunnelling protocol (e.g., IPsec, SSH), or any number of existing or future protocols.

Referring to FIGS. 1 and 2 in combination, the system 100 comprises the scanner 104 disposed at an entry to the storage facility, wherein the scanner 104 is configured to scan an item pickup code. Typically, at step 202, the method 200 comprises scanning an item pickup code at an entry to the storage facility. Herein, the term "scanner" refers to a device configured to optically scan texts, codes, images and/or objects and convert them into electronic information (such as, a digital image or a digital code) for further operation. For example, the scanner 104 may be a flat-bed scanner, a hand-held scanner, a sheet-fed scanner, or a drum scanner. Optionally, the scanner 104 may be selected from at least one of an imaging device (such as, a digital camera, a Pan, Tilt and Zoom (PTZ) camera and the like), or a scanning device (such as, a bar-code scanner, an optical character recognition (OCR) scanner, a magnetic ink character recognition (MICR) scanner and the like). As shown, the scanner 104 is configured to scan the item pickup code to be verified for determining the availability and the location of the item associated with the scanned item code. Herein, the "item pickup code" refers to a type of code, image or text associated with a pickup of an item stored in the storage facility. In an example, the item pickup code may be a bar code associated with an item in the storage facility that may be scanned via the scanner 104 to potentially determine relevant information related to the item to be picked up such as, by a courier (for example, delivery personnel, systems and/or processes). In another example, the item pickup code may be an alpha-numeric code associated with an item in the storage facility that may be scanned via the scanner 104 to potentially the determine relevant information related to the item to be picked up such as, by the courier. Beneficially, the scanner 104 enables the system 100 to determine whether the item associated with the scanner item pickup code is available at the storage facility or not, and optionally, provide the relevant information such as, but not limited to, location, availability, size and the like of the associated item to potentially save time and resources and enabling an efficient pickup of the item. Additionally, one or more imaging devices 108 comprising one or more image analysis and detection algorithms are arranged in the storage facility and/or overlooking the storage facility. The one or more imaging devices 108 are configured to provide the images of the interior of the storage facility that are used as disclosed herein for determining a pick up and/or drop-off of the correct item. In some embodiments, the one or more imaging devices 108 are also configured to detect suspicious or unwanted movement by a user inside (or outside) the storage facility and at such instances, the controller 102 is configured to initiate recording the movements and behaviour of the user inside (or outside) the storage facility. Such suspicious or unwanted movement may be, for example, loitering, moving multiple items within the storage facility, knocking on a door, and the like. Such activity may be detected by the one or more image analysis and detection algorithms employed.

In one or more embodiments, the scanner 104 is further configured to scan an item identification code of an item to be dropped-off, and wherein the controller 102 is further configured to receive a scan of the item identification code. Typically, the "item identification code" corresponds to a type of code configured to act as an identification for the associated item. Alternatively stated, each item is associated with an item identification code for easier and faster access during further analysis at a later stage. Further, the controller 102 is configured to determine a position in the storage facility for dropping-off the item therein, based, at least in part, on the item identification code of the item. Typically, the item picker is instructed (such as, via a display inside the storage facility) to place the item at the displayed/highlighted position. Furthermore, the controller 102 is configured to receive one or more images (such as, from the one or more imaging devices 108) of inside of the storage facility and to determine that the item has been placed at the determined position. Herein, while inside the storage facility, the item picker may be notified (such as, on the display) if they have placed the item at an incorrect position or in a position that obscures the view of another item and thus beneficially ensures that the imaging device has access to the item pickup codes and/or item identification codes.

In one or more embodiments, the controller 102 is further configured to generate an item pickup code associated with the item to be dropped-off and generate a notification to an item picker associated with the item to be dropped-off including the item pickup code associated with the item to be dropped-off in response to the item having been placed in the storage facility. Typically, the controller 102 is configured to generate the item pickup code associated with the dropped-off item and thereby generate the notification to the item picker associated with the item to be dropped-off and also includes the generated item pickup code therewith. Such a generation of the item pickup code enables the controller 102 to further verify and thereby grant entry to the item picker and prevents any unauthorized or maleficent access to the storage facility. Optionally, the controller 102 is configured to generate a second notification to the item picker associated with the item to be dropped-off, wherein the second notification is indicative of no items being left for pickup and beneficially, saves time and resources of the item picker.

In one or more embodiments, the controller 102 is further configured to determine a dwell time of the dropped-off item in the storage facility. The term "dwell time" as used herein refers to the amount of time an item (i.e., the dropped-off item) has been stored in the storage facility since being dropped-off. Notably, based on the dwell time, a priority of the items to be picked up may be established by the controller 102. In an example, a first item may have a dwell time of 15 minutes, whereas a second item may have a dwell time of 5 hours; in such a case, the second item may be prioritized for pickup by the controller 102. Further, the controller 102 is configured to determine that the dwell time exceeds a predefined threshold for the dropped-off item and if so generate a reminder notification to the item picker associated with the dropped-off item. The term "predefined threshold" refers to the maximum amount of dwell time allowed for any item, wherein the pre-defined threshold may range from a few hours to a few days. For example, the pre-defined threshold may be 12 hours. In another example, the pre-defined threshold may be 24 hours. In another example, the pre-defined threshold may be 60 minutes. Typically, based on the determination that the dwell time exceeds the predefined threshold for the dropped-off item, the controller 102 is configured to generate the reminder notification to the item picker associated with the dropped-off item. In an example, after a pre-defined threshold of 6 hours, the controller 102 transmits a reminder notification in the form of a text message to a device of the item picker. Beneficially, any user may be indicated or alerted of the dwell time status of the items and correspondingly allows timely pickup and thereby timely delivery of the items to the intended recipient. Moreover, the provision of the dwell time status via the controller 102 prevents the manual re-scanning of each of the items stored (to calculate the dwell time) in the storage facility and thereby reduces the associated time and resources required to perform the same operation. In an exemplary scenario, users (such as, the item picker) may visually analyse the items in the storage facility based on the associated dwell time. Herein, the dwell times may be defined as green indicative of a minimal accumulated dwell time (for example, lesser than 3 hours), orange indicative of a medium length of dwell times (for example, between 3 and 6 hours), and red for long accumulated dwell times (for example, greater than 6 hours).

Referring to FIGS. 1 and 2 in combination, the system 100 further comprises a controller 102, wherein the controller 102 is configured to receive the scanned item pickup code to determine if there is an item associated with the item pickup code being stored in the storage facility. Typically, at a step 204, the method 200 further comprises determining if there is an item associated with the item pickup code being stored in the storage facility. Herein, upon receiving the item pickup code from the communicably coupled scanner 104, the controller 102 is configured to check and thereby determine whether there is an item associated with the scanned item pickup code stored in the storage facility or not. In an example, the scanner 104 scans a first pickup code associated with a first item, wherein the controller 102 receives the scanner first pickup code from the scanner 104 and determines whether an item associated therewith is present or not and accordingly the controller may permit or deny entry to an item picker (or user) based on the determination by the controller. Beneficially, such a determination by the controller 102 enables the system 100 and the method 200 to provide a secure and private monitoring of the pickup and drop-off of the item in the storage facility.

Referring to FIGS. 1 and 2 in combination, the controller 102 is further configured to grant entry to the storage facility to an item picker. Typically, based on the determination by the controller 102, whether the item associated with the item pickup code is stored in the storage facility or not, at a step 206, the method 200 further comprises granting entry to the storage facility to the item picker to the storage facility. The "item picker" refers to a user employing the system or method, wherein the item picker may be a delivery personnel or a user (i.e., the recipient of the item). Thus, upon successful determination that the item is present in the storage facility, only then the controller 102 grants entry to the storage facility to the item picker and thus prevents unauthorized access and potential theft issues associated with such storage and delivery operations.

Herein, optionally, the grant of entry to the storage facility is based on provision of a remotely operable barrier or a door (of the storage facility), operatively coupled to the controller 102, wherein the controller 102 is configured to transmit control signals to the barrier to open (or close) based on whether the entry grant is provided or not. In an example, the barrier remains closed unless a control signal is provided by the controller 102. In another example, the barrier is opened upon successful scanning and verification of an employee badge of the item picker. In another example, the barrier is opened upon successful authentication of a user QR code.

In one or more embodiments, the controller 102 is further configured to determine that requisite personal equipment is being worn by the item picker, and, if not, deny entry to the storage facility to the item picker. Additionally, the system 100 and the method 200 may be employed to further ensure a safe and secure pick-up and drop-off of the items in the storage facility. Typically, the controller 102 configured to determine whether the item picker is wearing the requisite personal equipment such as, masks, gloves, lab coats, hair nets, preventive kits such as, personal preventive equipment's (or PPE's) and the like before entering the storage facility and as a result of the determination, the controller 102 is thereby configured to deny or grant entry to the item picker based on whether requisite equipment is being worn or not. Beneficially, the system 100 and the method 200 enables provision of a safe and secure experience by monitoring a PPE status, and at the same time providing up-to-date information to the user with a secure retrieval process that results in packages being correctly picked up and/or dropped off at the storage facility.

Referring to FIGS. 1 and 2 in combination, the controller 102 is further configured to receive one or more images of inside of the storage facility. Typically, at a step 208, the method 200 further comprises receiving one or more images of inside of the storage facility. Typically, the one or more images of the inside the storage facility are received by the controller 102 for a real-time or updated monitoring of the items in the storage facility. Beneficially, the one or more images of inside of the storage facility enables the controller 102 to analyse the received one or more images therein to provide relevant information to the item picker such as, item location, item information and the like required for further operation.

As discussed in the above, in one or more embodiments, the system 100 further comprises one or more imaging devices 108 configured for capturing the one or more images of the inside of the storage facility. The term "imaging device" as used herein refers to a device or module comprising one or more cameras and/or imaging sensors that may be configured to capture the one or more images of the inside of the storage facility. Optionally, the one or more imaging devices 108 may capture a video of the storage facility, wherein the one or more images may be frames of the video captured by each camera of the one or more imaging devices. The term "images" as used herein refer to visual representations of the storage facility and the elements therein such as, the item picker, the item, the item location and the like, captured by the one or more imaging devices 108. For example, the imaging device may be a digital camera, such as, a (digital single lens reflex) DSLR camera, a closed-circuit surveillance (CCTV) camera, a compact camera, a mirrorless camera and the like. Beneficially, the one or more imaging devices enable the system 100 or the method 200 to monitor (or survey) the pickup and drop-off of items in the storage facility in a secure and real time manner.

In one or more embodiments, the controller 102 is further configured to generate one or more indicators to guide the item picker to a location in the storage facility to enable pick-up of the item corresponding to the item pickup code. Moreover, in one or more embodiments, the one or more indicators are visual indicators and/or audio indicators. Typically, upon granting entry to the item picker, the controller 102 is further configured to generate the one or more indicators configured to guide the item picker to the item location inside the storage facility, wherein the one or more indicators may be visual or auditory indicators. In example, the visual indicators may be signs (for example, braille signs), instructions, markings, directions, maps, displays, lightings, and the like configured for enabling the user to find the item location in the storage facility. In another example, the audio indicators may be directions provided by a voice-assistant. In an exemplary scenario, the controller 102 is further configured to generate audio guided instructions such as, ordering supplies, returning packages, and reporting lost or stolen items for disabled or visually challenged users. In another exemplary scenario, the controller 102 is further coupled with a light guidance system to further enhance package identification for the user.

Referring to FIGS. 1 and 2 in combination, the controller 102 is further configured to determine an item picked by the item picker. Typically, at a step 210, the method 200 further comprises determining an item picked by the item picker. Herein, upon receiving the one or more images of the inside of the storage facility, the controller 102 is configured to analyse the images associated with the item picker, wherein an item is picked by the item picker to determine the picked-up item to further verify whether an accurate item is picked or not. Herein, the one or more images of the inside of the storage facility (for example, captured by the one or more imaging devices 108). Beneficially, such a determination by the system 100 or the method 200 enables verification of the item being picked up by the item picker (or the user) and ensures an accurate and query free operation and consequently a faster and efficient monitoring of the pickup and drop-off of the item in the storage facility. Notably, if an item has been misplaced or stolen, the user may report the theft via the system 100 or the method 200, wherein the controller 102 may guide the user through the proper channels to report the loss or theft. For example, the user may report the loss/theft such as, on a police department website. Additionally, the users may be further enabled to dial or connect to emergency numbers or agencies from within the storage facility.

Referring to FIGS. 1 and 2 in combination, the controller 102 is further configured to determine that the item picked by the item picker corresponds to the item pickup code. Typically, at a step 212, the method 200 further comprises determining that the item picked by the item picker corresponds to the item pickup code. Herein, upon determining the item picked by the item picker, the controller 102 is configured to verify and thereby determine that the item picked by the item picker corresponds to the item pickup code scanned by the scanner 104. Beneficially, such a determination enables the system 100 or method 200 to verify and potentially avoid any errors (or inaccurate pickups) to provide a query free and efficient monitoring of the pickup and drop-off of items in the storage facility.

In one or more embodiments, the controller 102 is further configured to grant exit to the item picker if it is determined that the item picked by the item picker corresponds to the item pickup code. Typically, if the controller 102 determines that the item picked by the item picker corresponds to the item pickup code scanner via the scanner 104, the controller 102 is configured to grant exit to the item picker from the storage facility. Beneficially, no other personnel except for the item picker associated with the item to be picked up may leave the premises of the storage facility and thus ensures an efficient and query free operation.

Referring to FIGS. 1 and 2 in combination, the controller 102 is further configured to generate a wrong pick-up signal. Typically, at a step 214, the method 200 further comprises generating a wrong pick-up signal. Herein, if and when the controller 102 determines that the item does not correspond with the item pickup code scanned via the scanner 104, the controller 102 is configured to generate the wrong pick-up signal. The term "wrong pick-up signal" as used herein relates to a control signal transmitted via the controller 102 indicative of an incorrect item pickup via the item picker. In an example, the wrong pick-up signal may be a message alert transmitted to a device of the item picker. In another example, the wrong pick-up signal may be an audio alert via an external speaker. Beneficially, the generation of the wrong pick-up signal alerts the item picker of an incorrect pickup and allows for replacement thereof with an accurate package to thereby enable a secure, accurate and efficient monitoring of the pickup and drop-off of items in the storage facility.

In one or more embodiments, the controller 102 is further configured to deny exit to the item picker from the storage facility in response to the generation of the wrong pick-up signal. Typically, if the controller 102 determines that the item picked up by the item picker does not correspond to the item pickup code scanned via the scanner 104, the controller 102 is then configured to deny exit to the item picker from the storage facility in response to the generation of the wrong pick-up signal. Beneficially, such a denial of exit to the item picker ensures a secure and accessible monitoring of the items being picked up or dropped off at the storage facility and consequently prevents any item picker from collecting a wrong item or any potential theft issues.

In one or more embodiments, the controller 102 is further configured to generate an audible alarm in response to generation of the wrong pick-up signal. Typically, the controller 102 transmits the wrong pick-up signal and in lieu of which the audible alarm is generated by the controller 102 indicative of the wrong-pickup and thereby enabling the item picker to drop the currently picked wrong item and instead pick up a correct item associated with the item pickup code. Beneficially, the generated audible alarm alerts the item picker of the inaccurate pickup and thereby improves the accuracy of the system and method and at the same time reduces the associated time and costs during any mix-ups or errors.

Referring to FIGS. 1 and 2 in combination, in one or more embodiments, the system 100 further comprises a second scanner 110 disposed inside the storage facility, the second scanner 110 being configured to scan a second item pickup code, and wherein the controller 102 is further configured to receive a scan of the second item pickup code, determine that the second item pickup code corresponds to one of items stored in the storage facility and if so determine that an item picked by the item picker corresponds to the second item pickup code. Typically, the second scanner 110 is disposed inside the storage facility for additional items that may be required to be picked up by the item picker, however, were not scanned by the first scanner for granting entry to the storage facility. Thus, to leave the storage facility, the item picker will be required to employ the second scanner to scan any other items except for the first item (i.e., scanned by the first scanner 104) and as a result, improves the security and accessibility to the storage facility and at the same time preventing any potential fraudulent action or honest mistakes by the item picker or any other unauthorized person.

In one or more embodiments, the controller 102 is further configured to generate a report related to one or more of: storage facility occupancy metrics, drop-off metrics, pickup metrics, registered user activities, item pickers activities. Typically, the controller 102 is configured to generate the report to beneficially visualize the impact of the system 100 or method 200 at each instance that may be further utilized to audit and improve upon existing capabilities. Herein, the generated report comprises multiple metrics and is related to one or more of storage facility occupancy metrics, drop-off metrics, pickup metrics, registered user activities, item pickers activities that beneficially enables the controller 102 to derive beneficial references therefrom and thereby enabling effective and efficient monitoring of the item pickup and drop-off inside the storage facility. Herein, the metrics may include, but is not limited to, percentage of PPE scan passed/failed, percentage of card scans that passed/failed, accumulated dwell time for packages, average number of packages that come in during a drop off, busiest times of day, space occupancy metrics daily/weekly/etc, item counts per day/week/etc, employee timing reports, number of registered or assigned packages, number of unassigned packages, number of high value packages in lockers, percentage until full capacity (current), active users in a day/week/etc, updated images of the storage facility for security purposes, ability to select a time range, and ability to rewind the images for specific past data and so forth.

Beneficially, the system 100 and the method 200 are configured for creating a safe and secure premise or facility for users (such as, the employees and/or the customers) to drop off and pick up items from the storage facility of the service provider (for example, the service provider may be USPS) and does not involve any human contact during operation and thus minimizes the associated risks of contamination. Moreover, the system 100 and the method 200 provides shipping and receiving independence to each user, and enables engagement across various communities by offering simple and efficient access to such secure spaces (i.e., the storage facilities). Additionally, the system 100 and the method 200 enables the user (such as, the employees of the service provider) to monitor the activity and/or dwell time of each of the items in the storage facility at any given instant. Further, the system 100 and the method 200 enables the users to ship and return regular and high-value packages, and be notified of all package arrivals with customized notifications comprising at least the item pickup code and the item location. Moreover, the system 100 and the method 200 enables all the users to have the ability to securely access the storage facility through specific access codes (i.e., the item pickup code) and may view live (or recorded) security feeds within the storage facility to ensure a safe and easy experience. Beneficially, such an extensive spectrum of features of the system 100 and the method 200 minimizes the associated labour and travel costs that may be required conventionally in order to obtain such a secure and safe space for users to mail packages, wherein the system 100 and the method 200 enables postal users to unlock unique shipping features and receive any information related to the item with an access code (i.e., the item pickup code).

Figure 3A:
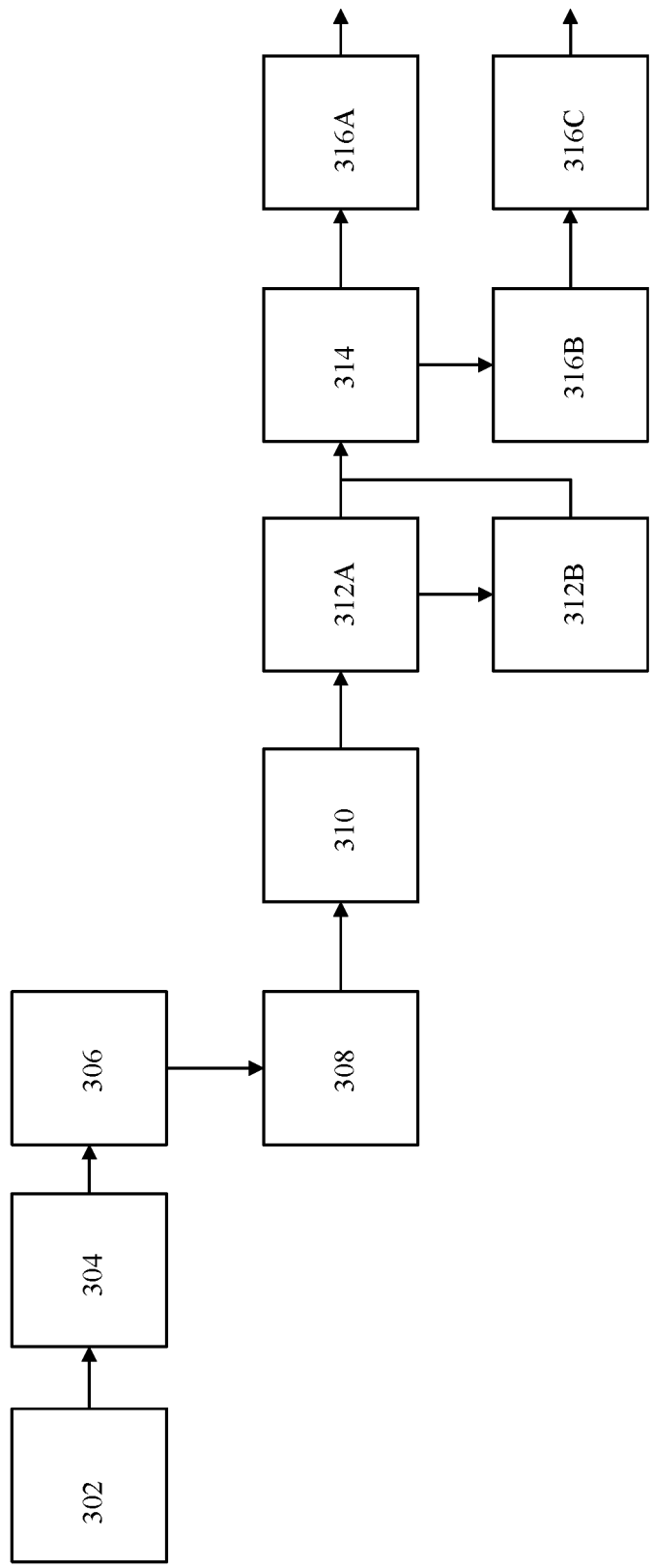
FIGS. 3A-3B illustrate schematic flowcharts listing steps involved in a process for monitoring pickup and drop-off of items in a storage facility, in accordance with various embodiments of the teachings herein.
Figure 3B:
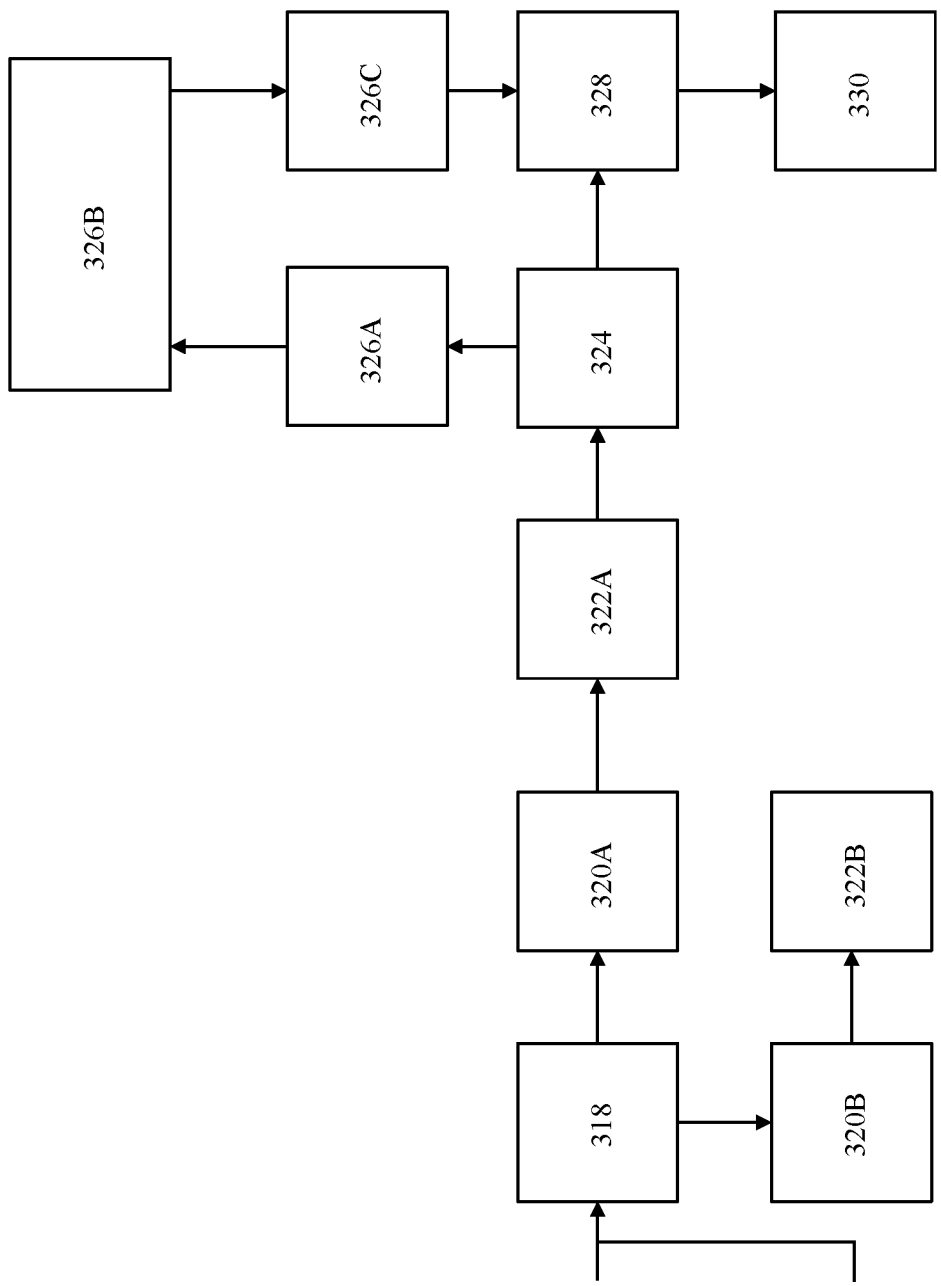

Referring to FIGS. 3A and 3B in combination, illustrated are schematic process flowcharts listing steps involved in a process 300 implemented via the system 100 for monitoring pickup and drop-off of items stored in a storage facility, in accordance with various embodiments of the teachings as disclosed herein. As shown, the process 300 comprises steps 302 to 330 as described later.

At a step 302, the process 300 comprises dropping off an item at the storage facility such as, by a user. For example, the user may directly drop off an item at the storage facility. In another example, a delivery personnel may be dropping off an item on behalf of the user.

At a step 304, the process 300 further comprises placing the dropped off item at an allocated location. For example, the item to be dropped off is placed in a modular shelving unit arranged inside the facility. At such an instance, the controller 102 may be configured to store the allocated location associated with each of the items to enable a faster and efficient pickup and drop-off operation.

At a step 306, the process 300 further comprises scanning an item code of each of the items in the storage facility via the scanner 104 scans and storing associated location of each item for faster and efficient retrieval of the item. Herein, the item code may be a bar code or a QR code, configured to acts as identification for the associated item.

At a step 308, the process 300 further comprises associating the scanned item pickup code with an identifier, wherein the identifier may be at least one of a name, user ID, email, mobile number and the like. Typically, to efficiently track the details of any item inside the storage facility, the scanned item code is associated with the identifier to enable the user or the controller 102 to effectively procure the identification information associated with any item inside the storage facility.

At a step 310, the process 300 further comprises transmitting a notification to the user, wherein the notification comprises at least the unique item pickup code (for example, a QR code) associated with the item or the item picker. Moreover, the item picker may receive notifications from the controller 102 when a user has dropped off a package that needs to be returned. Beneficially, this expedites the shipping process and ensures that the items packages will be picked up on any specific day. Also, the item picker may receive notifications from the controller 102 when a customer has dropped off a package that needs to be shipped. Beneficially, this expedites the shipping process and ensures that packages will be picked up on a specific day.

At a step 312A, the process 300 further comprises receiving the notification by the item picker. Upon receiving the notification, the item picker may proceed to visit the storage facility to pick up and/or drop-off an item.

Optionally, at a step 312B, the process 300 further comprises re-transmitting the notification to the item picker if the dwell time of the item exceeds a predefined threshold. For example, if the item is not picked up within 24 hours, the notification is re-transmitted by the controller 102. For example, If a user does not visit the storage facility to pick up their item in a certain amount of time, the controller 102 will trigger an action for the item picker to return the package to the original sender. Once this is triggered, the recipient will also receive a notification indicating that their package has been returned.

At a step 314, the process 300 further comprises arrival of the item picker at the storage facility upon receiving the notification for pickup of the item and thereby verifying the item pickup code in the notification presented by the item picker.

At a step 316, the process 300 further comprises verifying whether the item picker is wearing proper protective equipment or not. For example, an imaging device may be employed by the controller 102 to check whether the user is correctly wearing at least a mask and gloves before entering the storage facility and correspondingly determine whether the item picker passes or fails the inspection. Typically, at a step 316A, the item picker passes the inspection. Optionally, instead of requiring a QR code i.e., the item pickup code for verification, the scanner 104 may scan an identification document of the item picker in lieu of the identification of the item picker and thus even grants access to users not having devices or smartphones for verification.

Optionally, at a step 316B, the item picker fails the inspection and as a result, at a step 316C, when the item picker fails the verification associated with the PPE, the process 300 further comprises correcting the error associated with the inspection or verification for a re-verification thereat.

At a step 318, the process 300 further comprises scanning the item pickup code for verification. Typically, the item pickup code displayed in the transmitted notification is scanner by the scanner 104 to verify whether the item is present inside the storage facility or not. For example, the item pickup code received by the item picker as a notification is scanned by the scanner 104.

At a step 320A, if the scanned item pickup code passes the verification, then at a corresponding step 322A, the controller 102 is configured to grant entry to the item picker.

Optionally, at a step 320B, if the scanned item pickup code fails the verification, then at a corresponding step 322B, the controller 102 is configured to demy entry to the item picker.

At a step 324, the process 300 further comprises displaying or highlighting the item to be picked up on a display unit (or display). Herein, the storage facility may comprise the display unit configured to provide a visual representation of the inside of the storage facility to enable the user to track and thereby find the item to be picked up in a faster and efficient manner. For example, the display may be a user device, a display (such as, a liquid crystal display (LCD), a light emitting diode (LED) display, and the like), a computing device, a laptop, a smart phone, a tablet and so forth.

At a step 326A, the item picker picks up an incorrect item from the storage facility. For example, the item picker picks an item from a wrong shelf. In such cases, at a step 328A, an error notification indicative of a wrong item pickup is transmitted to the item picker.

Optionally, at a step 326B, the process 300 further comprises re-displaying or re-highlighting the item to be picked up on the display unit to enable the item picker to pick the correct item instead of the incorrect item.

At a step 328, the process 300 further comprises granting exit to the item picker if a correct item is picked up from the storage facility. For example, the item picker picks an item from the correct allocated shelf. In such cases, the controller 102 is configured to grant exit to the item picker to further deliver the item to the intended recipient.

At a step 330, the process 300 further comprises attempting re-entry to the storage facility upon exiting therefrom. Herein, the controller 102 does not grant re-entry to the item picker and thereby the barrier or door remains locked for entry.

Figure 4A:
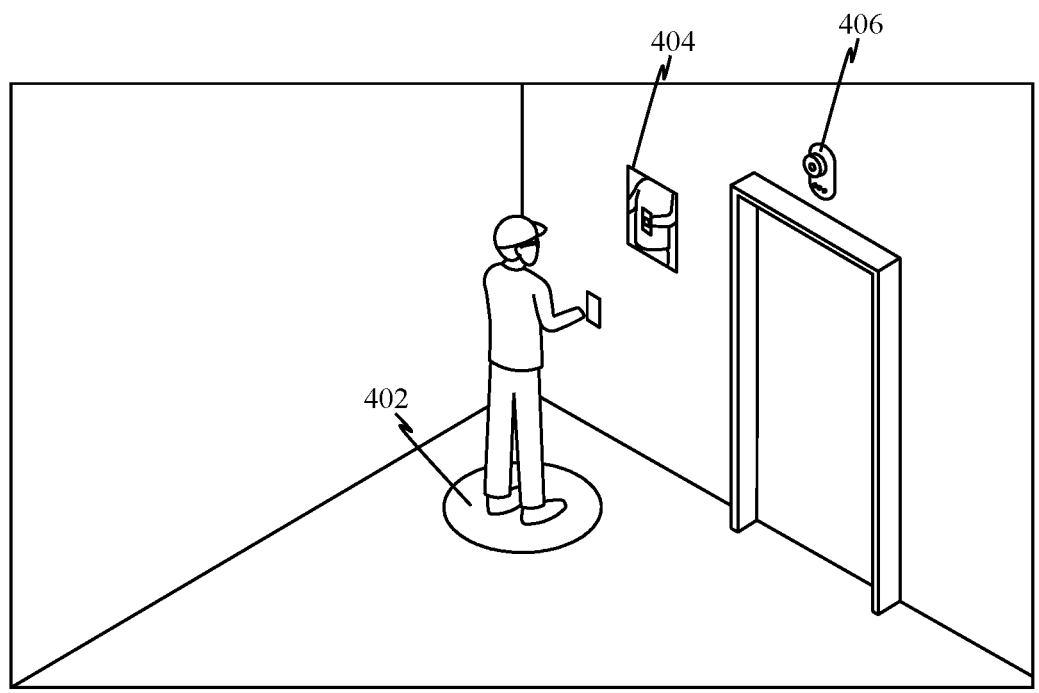
FIGS. 4A-4C illustrate exemplary implementations of the system or method for monitoring pickup and drop-off of items in a storage facility, in accordance with various embodiments of the teachings herein.
Figure 4B:
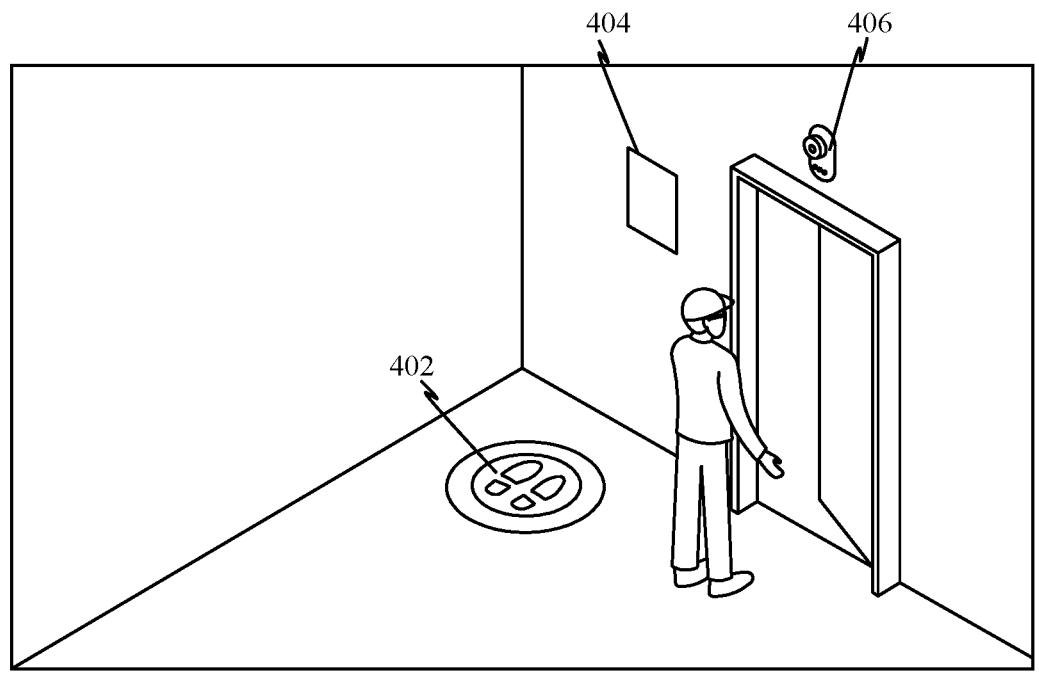
Figure 4C:
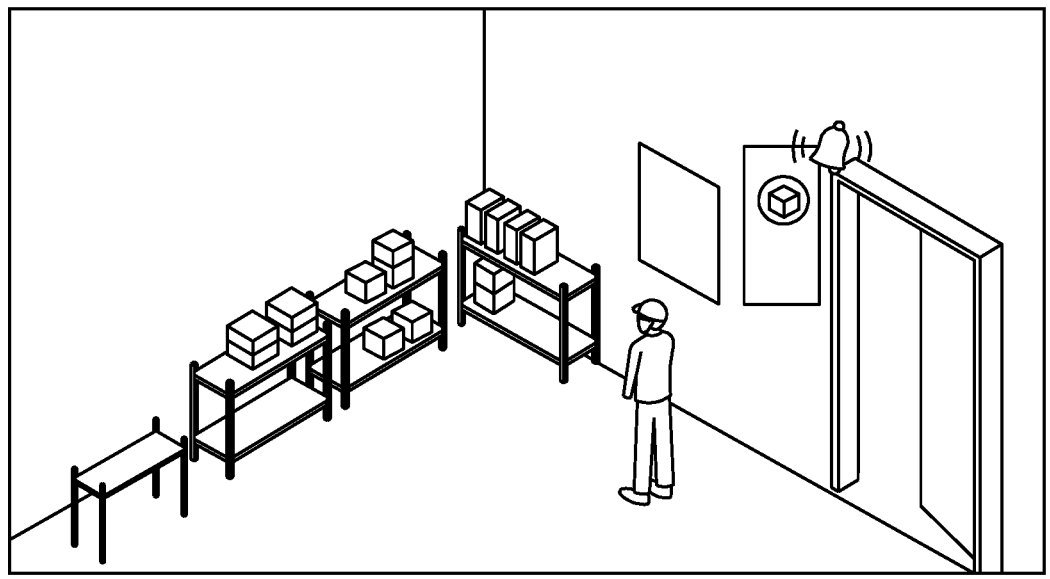

Referring to FIGS. 4A to 4C, illustrated are exemplary implementations of the system 100 or method 200 for monitoring pickup and drop-off of items in a storage facility, in accordance with various embodiments of the teachings as disclosed herein. As shown, each of the FIGS. 4A-4C represent three different steps implemented by the system 100 for monitoring the pickup and drop-off of items in the storage facility.

Referring to FIG. 4A, illustrated is a first step involved in the monitoring via the system 100, in accordance with an embodiment of the teachings herein. As shown, at the first step, the item picker is configured to stand on an allocated standing location 402 while facing a display unit 404. Herein, the item picker is configured to present at least the item pickup code such that the controller 102 may grant entry thereafter.

Referring to FIG. 4B, illustrated is a second step involved in the monitoring via the system 100, in accordance with another embodiment of the teachings herein. As shown, upon successful authentication of the item picker and/or the item pickup code associated with item to picked-up, the controller 102 is configured to grant entry to the item picker by transmitting a control signal to a remotely operable door to enable the item picker to enter therefrom.

Referring to FIG. 4C, illustrated is a third step involved in the monitoring via the system 100, in accordance with another embodiment of the teachings herein. As shown, based on the item pickup and/or drop-off the associated item picker is quickly notified via a notification indicative of an item pickup.

Referring to FIGS. 5A-5E, illustrated are exemplary illustrations of various user interfaces of the system 100 or the method 200 for monitoring pickup and drop-off of items inside the storage facility, in accordance with various embodiments of the teachings as disclosed herein. Typically, FIGS. 5A-5E depict various tenant views as seen by a user while picking up or dropping off an item inside the storage facility.

Figure 5A:
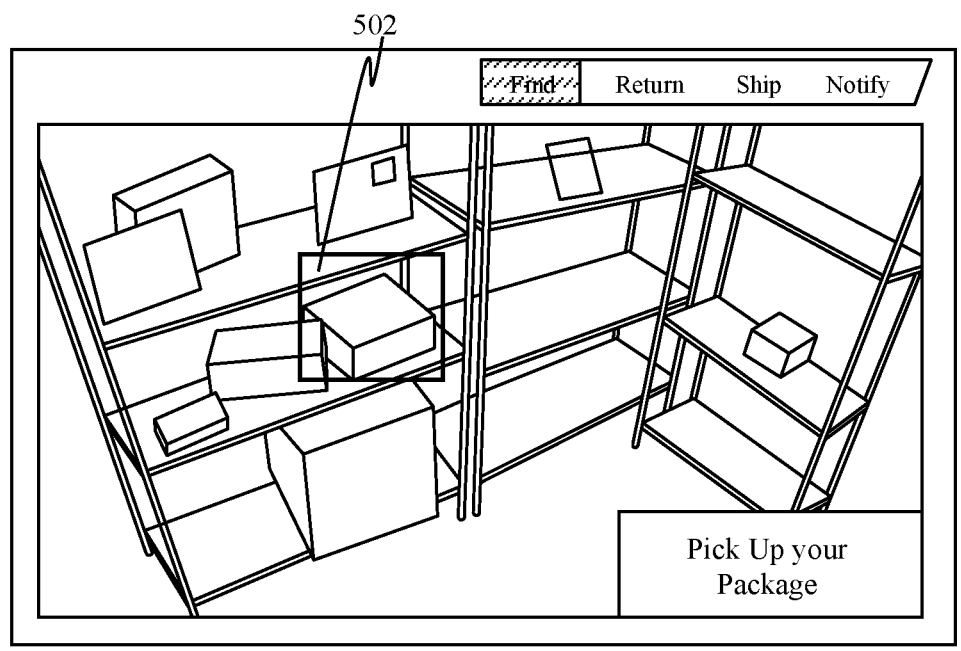
FIGS. 5A-5E illustrate exemplary illustrations of the various user interfaces of the system or method for monitoring pickup and drop-off of items in a storage facility, in accordance with various embodiments of the teachings herein.

Referring to FIG. 5A, illustrated is a searching interface 500A of the system 100 or the method 200 for monitoring pickup and drop-off of items inside the storage facility, in accordance with various embodiments of the teachings as disclosed herein. Typically, the searching interface 500A searches and displays the item location inside of the storage facility. As shown, the item 502 to picked up is highlighted by a bounding box. Typically, the item picker may view the searching interface 500A to find the item to be picked up and thereby collect it for delivery.

Figure 5B:
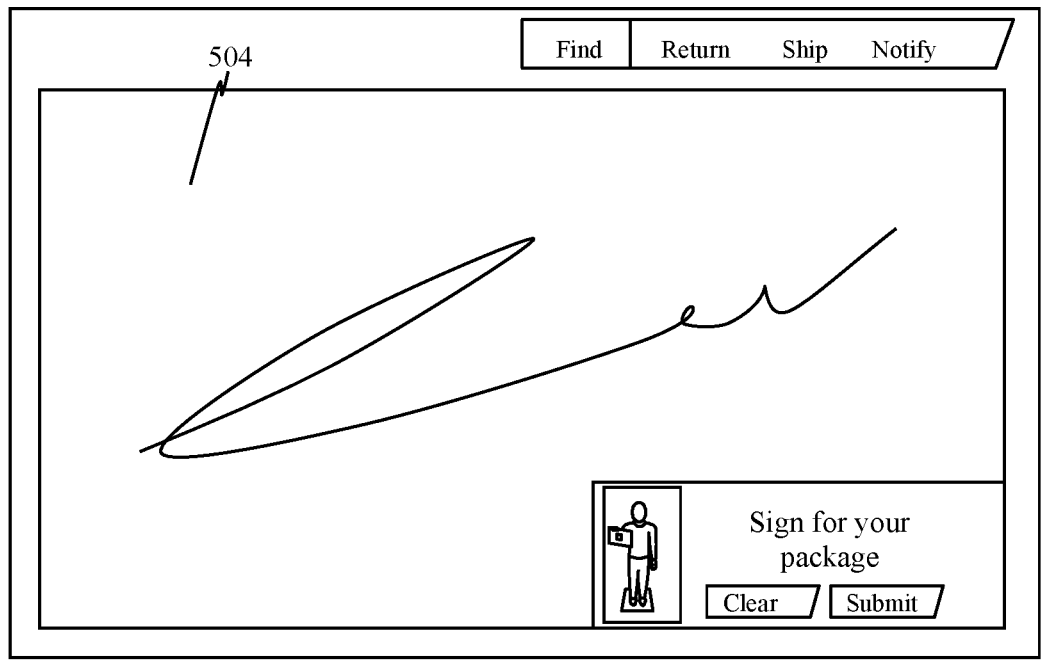

Referring to FIG. 5B, illustrated is a verification interface 500B of the system 100 or the method 200 for monitoring pickup and drop-off of items inside the storage facility, wherein the verification interface 500B is configured to collect an authentication (or sign) from the user. As shown, the user has provided authentication as a signature 504 across the verification interface 500B (such as, via a digital pen).

Figure 5C:
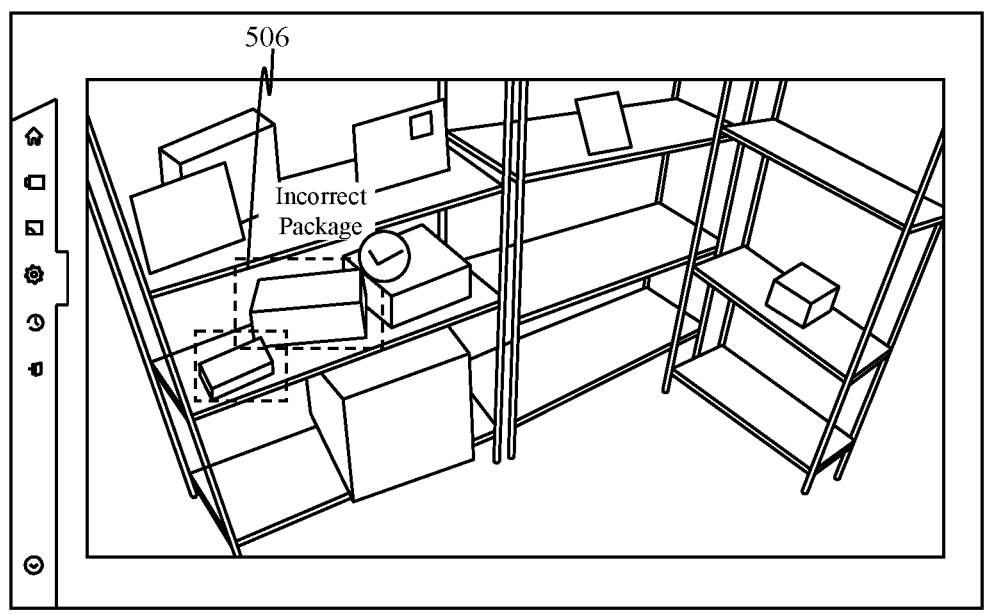
Figure 5D:
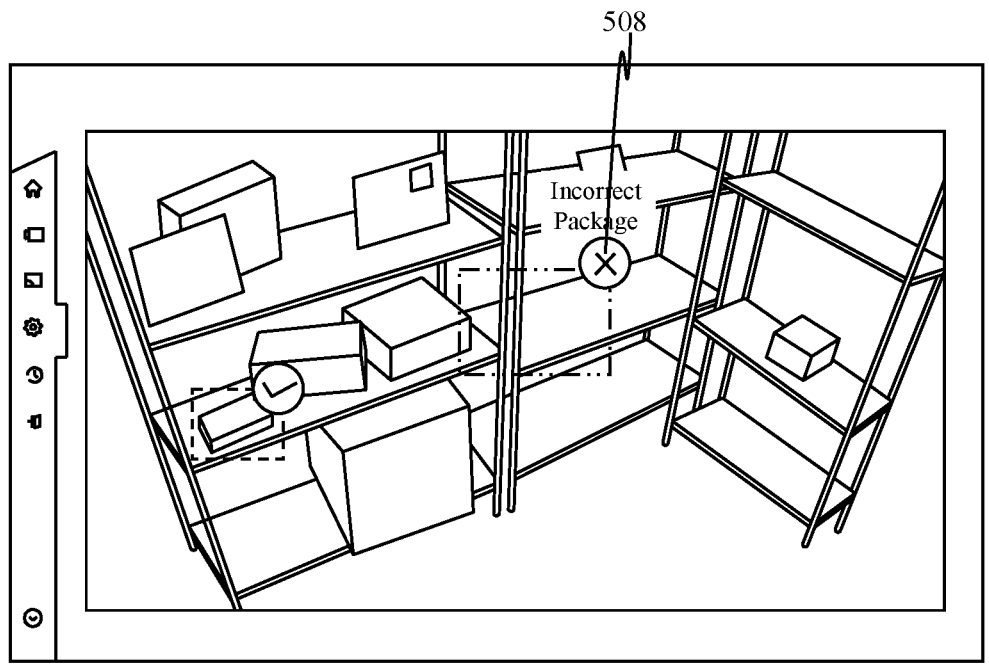

Referring to FIGS. 5C and 5D, illustrated are first and second correction interfaces 500C and 500D of the system 100 or the method 200 for monitoring pickup and drop-off of items inside the storage facility, wherein the first correction interface 500C is configured to display or alert the item picker if an inaccurate item has been picked up and whereas the second correction interface 500D is configured to display the correct item to be picked up. As shown, the incorrect item 506 and the correct item 508 to be picked up is displayed on the first correction interface 500C and the second correction interface 500C, respectively, to enable the item picker to replace the incorrect item with the correct item.

Figure 5E:
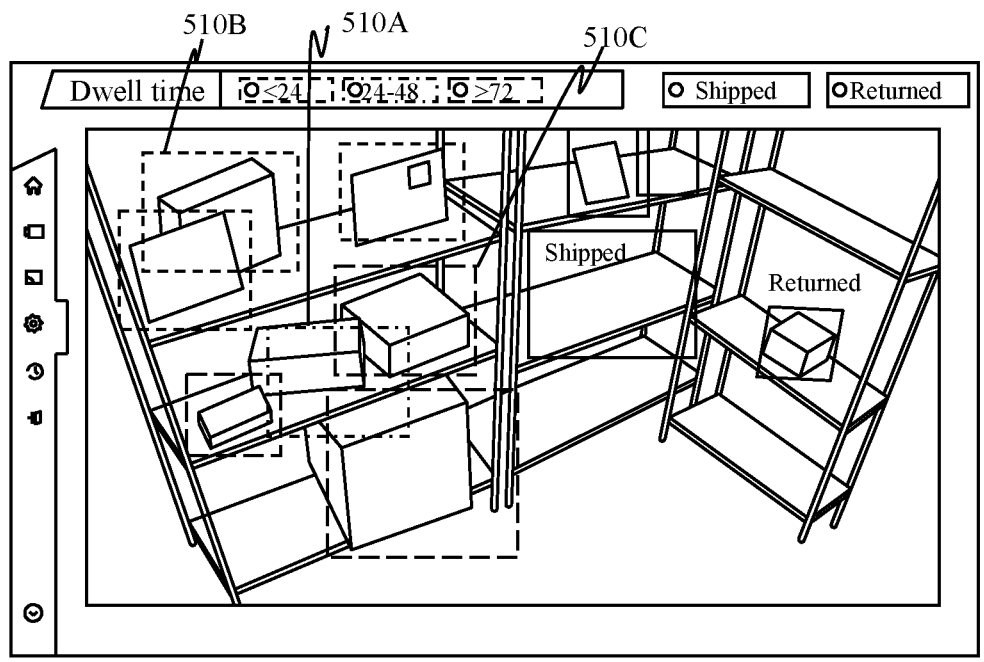

Referring to FIG. 5E, illustrated is a time interface 500E of the system 100 or the method 200 for monitoring pickup and drop-off of items inside the storage facility, wherein the time interface 500E is configured to display at least a dwell time determined by the controller 102 associated with each of the items inside the storage facility. As shown, the time interface 500E comprises different indicators associated with a type of priority of the item to be picked up. Herein, three different indicators (associated with three different priorities) are depicted via different bounding boxes defined by different dashed patterns forming the bounding boxes. Typically, the three different indicators being a first type of indicator 510A comprising dashes and dots combined indicative of a dwell time of lesser than 24 hours, a second type of indicator 510B comprising semi-dashed boxes indicative of a dwell time between 24 and 48 hours for semi-urgent pickups of associated items and a third type of indicator 510C comprising highly dashed boxes comprising highly urgent pickups or deliveries indicative of a dwell time greater than 72 hours. Beneficially, such a distinction provided by the time interface 500E enables the item picker to quickly assess the urgent deliveries and ensure timely deliveries to the intended recipient.

Modifications to embodiments of the teachings herein described in the foregoing are possible without departing from the scope of the teachings herein as defined by the accompanying claims. Expressions such as "including", "comprising", "incorporating", "have", "is" used to describe and claim the teachings herein are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the teachings herein, which are, for clarity, described in the context of separate embodiments, may also be provided in combination in a single embodiment. Conversely, various features of the teachings herein, which are, for brevity, described in the context of a single embodiment, may also be provided separately or in any suitable combination or as suitable in any other described embodiment of the teachings herein.

The invention claimed is:

1. A system for monitoring pickup and drop-off of items in a storage facility, the system comprising a scanner disposed at an entry to the storage facility, the scanner configured to scan an item pickup code, and a controller, wherein the controller is configured to:
   receive the scanned item pickup code;
   determine if there is an item associated with the item pickup code being stored in the storage facility; and, if so,
   grant entry to the storage facility to an item picker;
   receive one or more images of inside of the storage facility;
   determine an item picked by the item picker;
   determine that the item picked by the item picker corresponds to the item pickup code; and, if not,
   generate a wrong pick-up signal,
   wherein one or more imaging devices comprising one or more image analysis and detection algorithms are arranged in the storage facility and/or overlooking the storage facility, wherein the one or more imaging devices are configured to provide the images of interior of the storage facility, and wherein the one or more imaging devices are configured to detect suspicious or unwanted movements by a user in the storage facility.

2. A system according to claim 1, wherein the controller is further configured to grant exit to the item picker if it is determined that the item picked by the item picker corresponds to the item pickup code.

3. A system according to claim 1, wherein the scanner is further configured to scan an item identification code of an item to be dropped-off, and wherein the controller is further configured to:
   receive a scan of the item identification code;
   determine a position in the storage facility for dropping-off the item therein, based, at least in part, on the item identification code of the item;
   receive one or more images of inside of the storage facility; and to determine that the item has been placed at the determined position.

4. A system according to claim 3, wherein the controller is further configured to:
generate an item pickup code associated with the item to be dropped-off; and
generate a notification to an item picker associated with the item to be dropped-off including the item pickup code associated with the item to be dropped-off in response to the item having been placed in the storage facility.

5. A system according to claim 3, wherein the controller is further configured to:
determine a dwell time of the dropped-off item in the storage facility;
determine that the dwell time exceeds a predefined threshold for the dropped-off item; and if so
generate a reminder notification to the item picker associated with the dropped-off item.

6. A system according to claim 1, wherein the controller is further configured to deny exit to the item picker from the storage facility in response to generation of the wrong pick-up signal.

7. A system according to claim 1, wherein the controller is further configured to generate an audible alarm in response to generation of the wrong pick-up signal.

8. A system according to claim 1, wherein the controller is further configured to generate one or more indicators to guide the item picker to a location in the storage facility to enable pick up of the item corresponding to the item pickup code.

9. A system according to claim 8, wherein the one or more indicators are visual indicators and/or audio indicators.

10. A system according to claim 1, wherein the controller is further configured to determine that requisite personal equipment is being worn by the item picker, and, if not, deny entry to the storage facility to the item picker.

11. A system according to claim 1, further comprising a second scanner disposed inside the storage facility, the second scanner being configured to scan a second item pickup code, and wherein the controller is further configured to receive a scan of the second item pickup code, determine that the second item pickup code corresponds to one of items stored in the storage facility; and if so
determine that an item picked by the item picker corresponds to the second item pickup code.

12. A system according to claim 1, wherein the controller is further configured to generate a report related to one or more of: storage facility occupancy metrics, drop-off metrics, pickup metrics, registered users activities, item pickers activities.

13. A method for monitoring pickup and drop-off of items in a storage facility, the method comprising:
scanning an item pickup code at an entry to the storage facility;
determining if there is an item associated with the item pickup code being stored in the storage facility; and, if so,
granting entry to the storage facility to an item picker;
receiving one or more images of inside of the storage facility;
determining an item picked by the item picker;
determining that the item picked by the item picker corresponds to the item pickup code; and, if not,
generating a wrong pick-up signal,
wherein one or more imaging devices comprising one or more image analysis and detection algorithms are arranged in the storage facility and/or overlooking the storage facility, wherein the one or more imaging devices are configured to provide the images of interior of the storage facility, and wherein the one or more imaging devices are configured to detect suspicious or unwanted movements by a user in the storage facility.

14. A method according to claim 13, further comprising granting exit to the item picker if it is determined that the item picked by the item picker corresponds to the item pickup code.

15. A method according to claim 13, further comprising:
scanning an item identification code of an item to be dropped-off;
determining a position in the storage facility for dropping-off the item therein, based, at least in part, on the item identification code of the item;
receiving one or more images of inside of the storage facility; and to
determining that the item has been placed at the determined position.

16. A method according to claim 15, further comprising:
generating an item pickup code associated with the item to be dropped-off; and
generating a notification to an item picker associated with the item to be dropped-off including the item pickup code associated with the item to be dropped-off in response to the item having been placed in the storage facility.

17. A method according to claim 13, further comprising:
determining a dwell time of the dropped-off item in the storage facility,
determining that the dwell time exceeds a predefined threshold for the dropped-off item; and if so
generating a reminder notification to the item picker associated with the dropped-off item.

18. A method according to claim 13, further comprising denying exit to the item picker from the storage facility in response to generation of the wrong pick-up signal.

19. A method according to claim 13, further comprising determining that requisite personal equipment is being worn by the item picker, and, if not, deny entry to the storage facility to the item picker.

20. A method according to claim 13, further comprising:
scanning a second item pickup code inside the storage facility;
determining that the second item pickup code corresponds to one of items stored in the storage facility; and if so
determining that an item picked by the item picker corresponds to the second item pickup code.

* * * * *